United States Patent
Park

(10) Patent No.: US 7,746,406 B2
(45) Date of Patent: *Jun. 29, 2010

(54) FOLDED COMPACT IMAGE CAPTURE APPARATUS

(75) Inventor: Ji-yun Park, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1306 days.

This patent is subject to a terminal disclaimer.

(21) Appl. No.: 10/740,568

(22) Filed: Dec. 22, 2003

(65) Prior Publication Data

US 2004/0130644 A1    Jul. 8, 2004

Related U.S. Application Data

(62) Division of application No. 09/218,165, filed on Dec. 22, 1998, now Pat. No. 6,697,117.

(30) Foreign Application Priority Data

Dec. 23, 1997   (KR) .................................. 97-72461

(51) Int. Cl.
*H04N 5/225* (2006.01)
*H04N 5/222* (2006.01)
(52) U.S. Cl. .................. 348/373; 348/333.06; 348/376
(58) Field of Classification Search .............. 348/14.01, 348/14.11, 14.16, 333.02, 151, 158, 333.01, 348/333.06, 333.11, 207.99, 373–376
See application file for complete search history.

(56) References Cited

U.S. PATENT DOCUMENTS

| 5,491,507 | A | 2/1996 | Umezawa et al. |
| D401,577 | S | 11/1998 | Yamaguchi |
| 5,898,600 | A | 4/1999 | Isashi |
| 5,903,706 | A | 5/1999 | Wakabayashi et al. |
| 6,069,648 | A | 5/2000 | Suso et al. |
| 6,141,052 | A | 10/2000 | Fukumitsu et al. |
| 6,445,417 | B1 | 9/2002 | Yoshida et al. |
| 6,466,202 | B1 | 10/2002 | Suso et al. |
| 6,473,631 | B1 | 10/2002 | Siddoway et al. |

FOREIGN PATENT DOCUMENTS

| EP | 1267576 A2 | 12/2002 |
| JP | 410065780 A | 3/1998 |

OTHER PUBLICATIONS

In re Gordon et al., 221 USPQ 1125 (CAFC 1984).
In re Ratti, 123 USPQ 349 (CCPA 1959).
U.S. Appl. No. 09/218,165, filed Dec. 22, 1998, Ji-yun Park, Samsung Electronics Co., Ltd.

*Primary Examiner*—Kelly L Jerabek
(74) *Attorney, Agent, or Firm*—Staas & Halsey LLP

(57) ABSTRACT

A digital still camera includes a main body; a liquid crystal display (LCD) panel coupled rotatably to an end portion of the main body of the camera in such a manner that a display portion thereof faces said main body; and a lens housing inserted rotatably and independently into a space formed in a portion where the main body and the LCD panel are coupled.

21 Claims, 3 Drawing Sheets

FOLDED COMPACT IMAGE CAPTURE APPARATUS

CROSS-REFERENCE TO RELATED APPLICATIONS

This application is a divisional of application Ser. No. 09/218,165, filed Dec. 22, 1998, now U.S. Pat. No. 6,697,117. This application is based upon and claims priority to Korean Patent Application No. 72461/1997, filed Dec. 23, 1998, the contents of which are incorporated herein by reference.

BACKGROUND OF THE INVENTION

1. Field of the Invention

The present invention relates to a digital still camera and, more particularly, to a digital still camera in which a liquid crystal display (LCD) panel is rotatably coupled to an end portion of the body of the camera and a lens housing is inserted to be independently rotatable, into a space between the body of the camera and the LCD panel.

2. Description of the Related Art

A conventional digital still camera is structured in that an LCD panel is mounted rotatably to the main body of the camera so as to allow a display portion thereof to be opened, and a lens housing is fixed to the main body of the camera. Alternatively, the lens housing is mounted rotatably to the main body of the camera while the LCD panel is fixed to an end portion of the camera.

In the former case, since the lens housing is fixed to the main body of the camera, users are required to move the main body of the camera when they wish to take pictures. However, in the latter case, since the display portion of the LCD panel is outwardly exposed, it can be easily damaged by an impact.

SUMMARY OF THE INVENTION

It is therefore an object of the present invention to provide a digital still camera which is reduced in size and is able to provide a convenient use.

Additional objects and advantages of the invention will be set forth in part in the description which follows and, in part, will be obvious from the description, or may be learned by practice of the invention.

To achieve the above and other objects of the present invention, there is provided a digital still camera including: a main body; a liquid crystal display (LCD) panel coupled rotatably to an end portion of the main body of the camera in such a manner that a display portion of the LCD panel faces the main body of the camera at a folded position of the LCD panel; and a lens housing inserted into a space formed in a portion where the main body of the camera and the LCD panel are coupled, which is rotatable independently of the main body of the camera and the LCD panel.

In addition, a first semicircular groove formed in an end portion of the body of the camera, and a second semicircular groove formed in the corresponding end portion of the LCD panel face each other, to thereby form a space into which the lens housing is inserted.

A coupling pin which connects the main body of the camera and the LCD panel to be rotatable is partially exposed to the space into which the lens housing is inserted, and preferably, the lens housing is screw-coupled to an end portion of the coupling pin.

Further, another end portion of the coupling pin is coupled to an operation lever for independently rotating the lens housing.

BRIEF DESCRIPTION OF THE DRAWINGS

The above and other objects and advantages of the present invention will become more apparent by describing in detail the preferred embodiments thereof with reference to the accompanying drawings, in which.

DESCRIPTION OF THE PREFERRED EMBODIMENT

Figure 1:
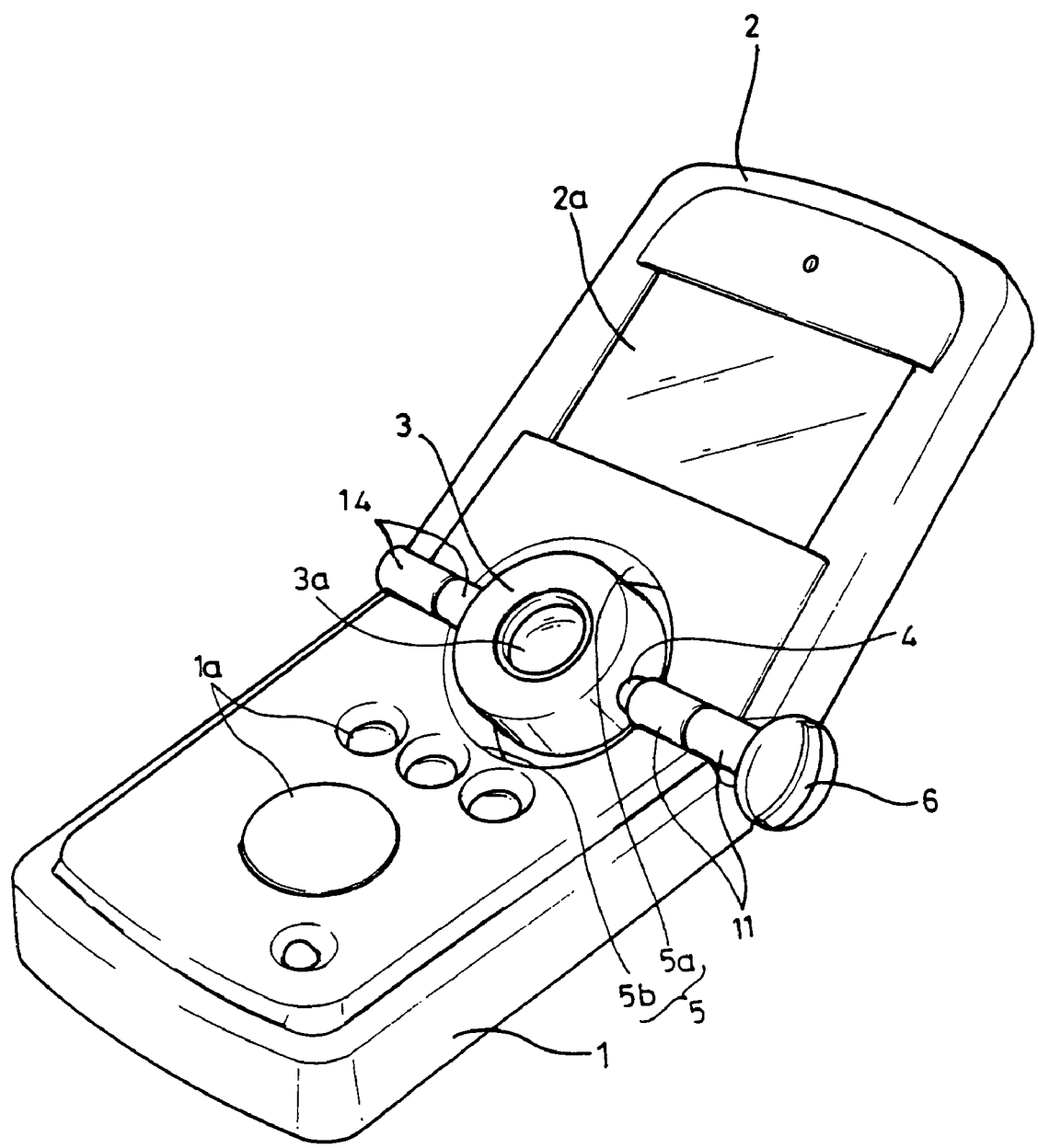
FIG. 1 is a perspective view showing a digital still camera according to an embodiment of the present invention.

The present invention now will be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those having skill in the art. Like reference numerals refer to like elements throughout.

FIG. 1 is a perspective view of a digital still camera according to an embodiment of the present invention. The digital still camera includes a main body 1 on which various operation keys 1a are arranged, a lens housing 3 having a taking lens 3a, and an LCD panel 2 having an LCD display 2a for displaying the image taken from the taking lens 3a.

Figure 2:
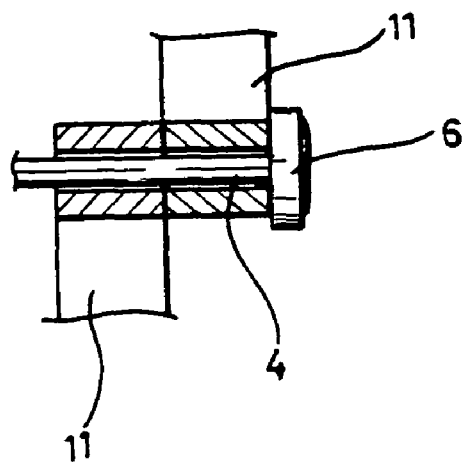
FIG. 2 is a section view showing a coupled state of a coupling pin of the digital still camera shown in FIG. 1.

The main body 1 and the LCD panel 2 are coupled by a coupling pin 4 which is inserted rotatably into coupling pin insertion portions 11 formed respectively in the end portions of the main body 1 and the LCD panel 2, as shown in FIGS. 1 and 2. Thus, the LCD panel 2 is allowed to be folded to the main body 1. Preferably, the display 2a is installed at the surface of the LCD panel 2 which contacts the main body 1 so as to be hidden when the LCD panel 2 is folded to the main body 1 (in a folded position).

A space portion 5 in which the lens housing 3 is rotatably disposed is arranged between the main body 1 and the LCD panel 2. The space portion 5 is formed by semicircular grooves 5a, 5b respectively formed in the end portions of the LCD panel 2 and the main body 1 of the digital still camera.

The coupling pin 4 is partially exposed in the space portion 5 and the lens housing 3 disposed in the space portion 5 is fixed to the coupling pin 4.

Figure 3:
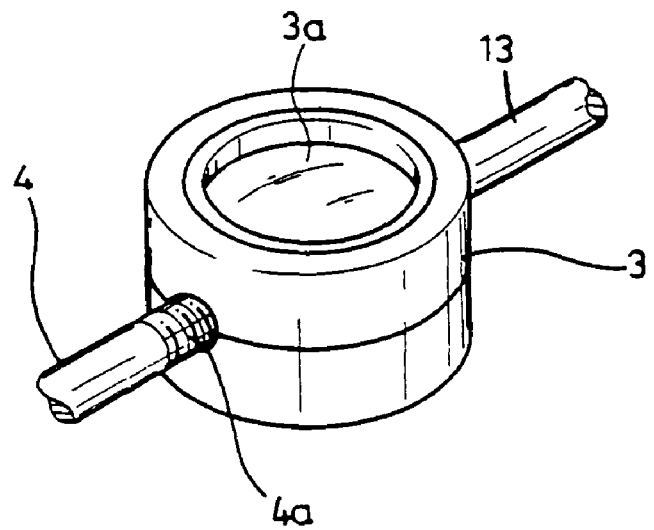
FIG. 3 is a perspective view showing a coupling between the coupling pin and a lens housing of the digital still camera shown in FIG. 1.

As shown in FIG. 3, a screw portion 4a is provided on an outer periphery of the coupling pin 4 which is exposed toward the space portion 5, and the screw portion 4a screws into the lens housing 3. In addition, an end portion of the coupling pin 4 opposite to that having the screw portion 4a is provided with an operation lever 6 for rotating the lens housing 3 within the space portion 5.

Another coupling pin 13 is rotatable within coupling pin insertion portions 14 formed respectively in the end portions of the main body 1 and the LCD panel 2, at a side of the lens housing 3 opposite to that of the coupling pin 4.

The structure of the digital still camera according to the embodiment of the present invention operates as follows.

Figure 4A:
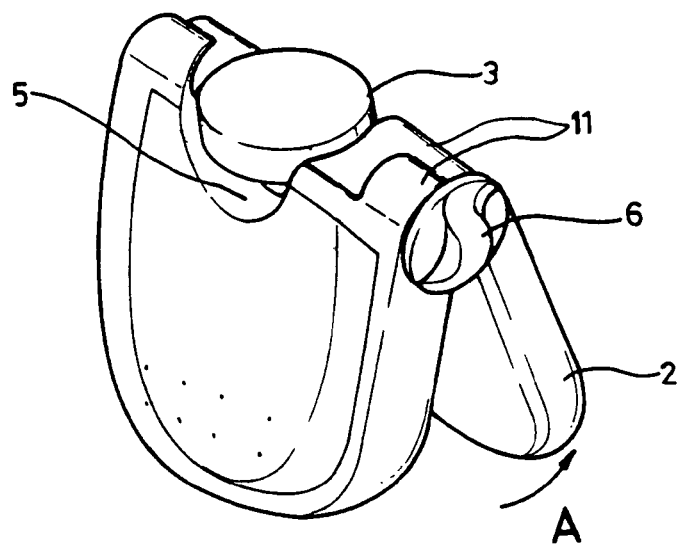
FIG. 4A is a perspective view showing the LCD panel which is nearly folded toward the main body of the digital still camera shown in FIG. 1.

First, to use the digital still camera according to the embodiment of the present invention, a user moves by one hand the LCD panel 2 in the direction indicated by the arrow shown in FIG. 4A centering on the coupling pin 4, after taking the main body 1 of the camera by the other hand, in a state (the folded position, which is not shown) where the LCD panel 2 is completely folded to the main body 1 of the camera. When the LCD panel 2 is in the folded position, the lens housing 3 is limited in rotation by the positioning of the semicircular grooves 5a, 5b.

Figure 4B:
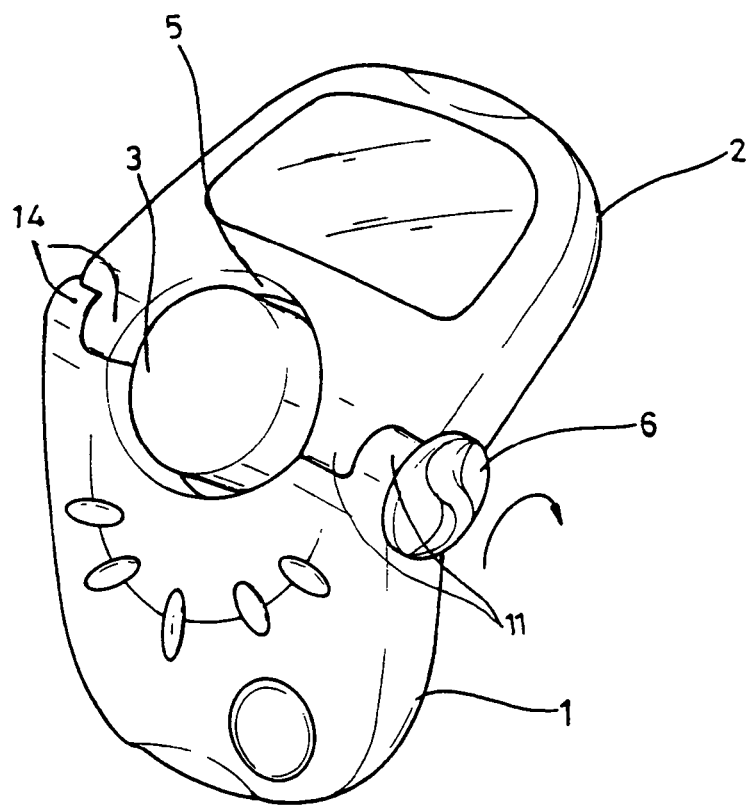
FIG. 4B is a perspective view showing a lens which is taking an object existing in front of the main body of the digital still camera shown in FIG. 1.

The user then continues to rotate the LCD panel 2 using the one hand so as to obtain an obtuse angle between the main body 1 of the camera and the LCD panel 2, as shown in FIG. 1. In such a state, the user rotates the operation lever 6 as shown in FIG. 4B so as to adjust the direction in which an object is taken. As a result of the rotation of the operation lever 6, the coupling pin 4 rotates in the coupling pin insertion portion 11 and the lens housing 3 rotates in the space portion 5 at the same time. Then, the object which exists in front of the taking lens 3a of the digital still camera is taken by the taking lens 3a of the lens housing 3.

If the object exists in the rear of the taking lens 3a of the digital still camera, for example, if the user wishes to take his/her own picture, the user rotates the lens housing 3 so as to change the direction in which an object is taken by the lens 3a.

According to the present invention, the LCD display is not outwardly exposed during the state (folded position) where the LCD panel is folded to the main body of the digital still camera. Therefore, the LCD display is not damaged by an external impact. The user operates the operation lever in the state where the LCD panel is unfolded from the main body of the camera, so as to rotate the lens housing and adjust the direction in which the object is taken. Thus, a digital still camera that has various conveniences is obtained.

Further, the LCD panel can be completely folded to the main body of the camera, which presents excellent appearance and a reduced size of the camera.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image capture apparatus, comprising:
a main member having an inner face and a cover face opposite said inner face:
a display support member having a front face and a back face opposite said front face, a display screen being disposed on said front face, said display support member and said main member being rotatably coupled together at a coupling end such that at least one of said display support member and said main member is rotatable so as to allow said image capture apparatus to be in a folded position, in which said inner face and said front face oppose each other in substantially parallel planes, and in an unfolded position, in which said cover face and said back face are angled relative to each other; and
a lens housing having enclosed therein a lens for capturing an image of an object, said lens housing being rotatable independently of the rotation of at least one of said main member and said display support member so as to allow said lens to be visibly exposed when said image capture apparatus is in said folded position,
wherein the rotation of the lens housing allows the lens to selectively be visibly exposed or not be visibly exposed when said image capture apparatus is in said folded position.

2. The image capture apparatus according to claim 1, wherein:
said main member includes at least one operation key disposed thereon for controlling said image capture apparatus.

3. The image capture apparatus according to claim 2, wherein:
said at least one operation key comprises a capture key for initiating said capturing said image of said object.

4. The image capture apparatus according to claim 3, wherein:
said capture key is disposed on said inner face.

5. An image capture apparatus, comprising:
a main member having an inner face and a cover face opposite said inner face:
a display support member having a front face and a back face opposite said front face, a display screen being disposed on said front face, said display support member and said main member being rotatably coupled together at a coupling end such that at least one of said display support member and said main member is rotatable so as to allow said image capture apparatus to be in a folded position, in which said inner face and said front face oppose each other in substantially parallel planes, and in an unfolded position, in which said cover face and said back face are angled relative to each other; and
a lens housing having enclosed therein a lens for capturing an image of an object, said lens housing being rotatable independently of the rotation of at least one of said main member and said display support member so as to allow said lens to be visibly exposed when said image capture apparatus is in said folded position,
wherein said lens housing is disposed in a cut-out portion formed in said main body member and said display member.

6. The image capture apparatus of claim 5, wherein a shape of the cut-out portion conforms to a shape of the lens housing.

7. An apparatus comprising:
a first portion;
a second portion having a display, next to the first portion;
a lens; and
a housing received within the first and second portions to house the lens, the housing being rotatable independent of the first and second portions, the housing and the first and second portions being rotatable about a longitudinal axis of the housing.

8. An image capture apparatus, comprising:
a main body having an end portion;
a display panel having a display portion and coupled rotatably to the end portion of said main body so that said display portion faces said main body in a folded position; and
a lens housing inserted into a space formed between said main body and said display panel where the main body and the display panel are coupled, said lens housing being rotatable independently of at least one of said main body and said display panel, the housing and the first and second portions being rotatable about a longitudinal axis of the housing.

9. An apparatus, comprising:
a first portion, comprising:
a front face, and
a back face;
a second portion, comprising:
a front face,
a display on the front face of the second portion, and
a back face;
a lens;
a housing to house the lens, the housing being inserted in a cutout extending from the front to the back faces of the first and second portions; and
a rotating unit to allow independent rotation of the housing relative to the first and second portions, the cutout accommodating the housing and not the rotating unit, the housing and the first and second portions being rotatable about a longitudinal axis of the housing.

10. An apparatus, comprising:
a first portion, comprising:
a front face, and
a back face;
a second portion, comprising:
a front face,
a display on the front face of the second portion, and
a back face;
a lens;
a housing to house the lens, the housing being inserted in a cutout extending from the front to the back faces of the first and second portions; and
a rotating unit to allow independent rotation of the housing relative to the first and second portions, the cutout accommodating the housing and not the rotating unit, wherein the rotating unit is not between the first and second portions, the housing and the first and second portions being rotatable about a longitudinal axis of the housing.

11. An apparatus comprising:
a main body having a front face, a back face, and an end portion;
a display panel having a display portion and being rotatably coupled to the end portion of the main body; and
a lens housing positioned between the main body and the display portion to capture an image, the lens housing being rotatable to point in a direction of the front face and to point in a direction of the back face.

12. The apparatus of claim 11, wherein the front face of the main body includes at least one operational key.

13. The apparatus of claim 11, further comprising a cutout portion in the main body to expose the lens housing.

14. The apparatus of claim 11, further comprising a cutout portion in the display panel to expose the lens housing.

15. An apparatus comprising:
a main body having an end portion, the main body including at least one operational key;
a display panel having a display portion and rotatably coupled to the end portion of the main body; and
a lens housing positioned in a cutout space formed between the main body and the display panel to capture an image, the lens housing being rotatable independent of at least the main body.

16. The apparatus of claim 15, wherein the main body has a front face including the at least one operational key and a back face, the lens housing being rotatable to point in the direction of the back face.

17. The apparatus of claim 15, wherein the cutout space is formed in the main body to expose the lens housing.

18. The apparatus of claim 15, wherein the cutout space is formed in the display panel to expose the lens housing.

19. An apparatus comprising:
a main body having a front face, a back face, and an end portion;
a display panel having a display portion and being rotatably coupled to the end portion of the main body; and
a lens housing positioned between the main body and the display portion to capture an image, the lens housing being independently rotatable relative to the main body and to the display panel, such that the lens housing is rotatable to point in a direction of the front face and to point in a direction of the back face.

20. The apparatus of claim 19, further comprising a cutout portion in the main body to expose the lens housing.

21. The apparatus of claim 20, further comprising a cutout portion in the display panel to expose the lens housing.

* * * * *